US008908403B2

(12) United States Patent
Hebborn et al.

(10) Patent No.: US 8,908,403 B2
(45) Date of Patent: Dec. 9, 2014

(54) LIGHT EMITTING DIODE LUMINAIRE FOR CONNECTION IN SERIES

(75) Inventors: Kevin A. Hebborn, Toms River, NJ (US); Samual David Boege, Point Pleasant, NJ (US)

(73) Assignee: Dialight Corporation, Farmingdale, NJ (US)

( * ) Notice: Subject to any disclaimer, the term of this patent is extended or adjusted under 35 U.S.C. 154(b) by 175 days.

(21) Appl. No.: 13/196,277

(22) Filed: Aug. 2, 2011

(65) Prior Publication Data

US 2013/0033176 A1 Feb. 7, 2013

(51) Int. Cl.

| | |
|---|---|
| ***H02M 7/00*** | (2006.01) |
| ***H02M 7/5383*** | (2007.01) |
| ***F21V 23/00*** | (2006.01) |
| ***F21K 99/00*** | (2010.01) |
| ***H05B 33/08*** | (2006.01) |

(52) U.S. Cl.
CPC ............... *F21K 9/135* (2013.01); *F21V 23/004* (2013.01); *H05B 33/0815* (2013.01)
USPC ............................................... 363/73; 363/74

(58) Field of Classification Search
USPC ............. 315/224, 200 R, 291, 112, 114, 115; 362/249.01, 249.02, 249.11, 800; 363/73–74
See application file for complete search history.

(56) References Cited

U.S. PATENT DOCUMENTS

| | | | | |
|---|---|---|---|---|
| 6,435,459 | B1 * | 8/2002 | Sanderson et al. | 246/473.3 |
| 7,575,346 | B1 * | 8/2009 | Horng et al. | 362/373 |
| 7,821,801 | B2 * | 10/2010 | Janson et al. | 363/126 |
| 8,328,394 | B2 * | 12/2012 | Lu et al. | 362/294 |
| 2002/0130640 | A1 * | 9/2002 | Acatrinei et al. | 323/222 |
| 2003/0015968 | A1 | 1/2003 | Allen | |
| 2007/0267984 | A1 | 11/2007 | Peng | |
| 2009/0146167 | A1 * | 6/2009 | Allen et al. | 257/98 |
| 2010/0109537 | A1 * | 5/2010 | Nishino et al. | 315/185 R |
| 2010/0207534 | A1 * | 8/2010 | Dowling et al. | 315/186 |
| 2010/0264737 | A1 * | 10/2010 | Chandler et al. | 307/66 |
| 2010/0264821 | A1 * | 10/2010 | Lutz et al. | 315/32 |
| 2010/0277067 | A1 | 11/2010 | Maxik et al. | |
| 2010/0308733 | A1 * | 12/2010 | Shao | 315/119 |
| 2011/0101877 | A1 * | 5/2011 | Zhan et al. | 315/206 |

OTHER PUBLICATIONS

International Search Report and Written Opinion for PCT/US2012/049205; Dec. 24, 2012, consists of 11 unnumbered pages.
Lunar Accents Design Corporation. Simple LED Circuits Design with LED Driver Circuit. Jul. 14, 2011. [retrieved on Nov. 29, 2012]. Retrieved from the Internet: http://web.archive.org/web/20110714003418/http://www.lunaraccents.com/desion-LED-circuits-design.htm? entire document.

* cited by examiner

*Primary Examiner* — Minh D A

(57) ABSTRACT

The present disclosure relates generally to a light emitting diode (LED) luminaire. In one embodiment, the LED luminaire includes a base, a heat sink coupled to the base, a power supply coupled to an interior volume of the heat sink, one or more LEDs coupled to the power supply, wherein the one or more LEDs are coupled to a circuit configured to provide a constant input impedance and a lens coupled to the heat sink and enclosing the one or more LEDs.

12 Claims, 9 Drawing Sheets

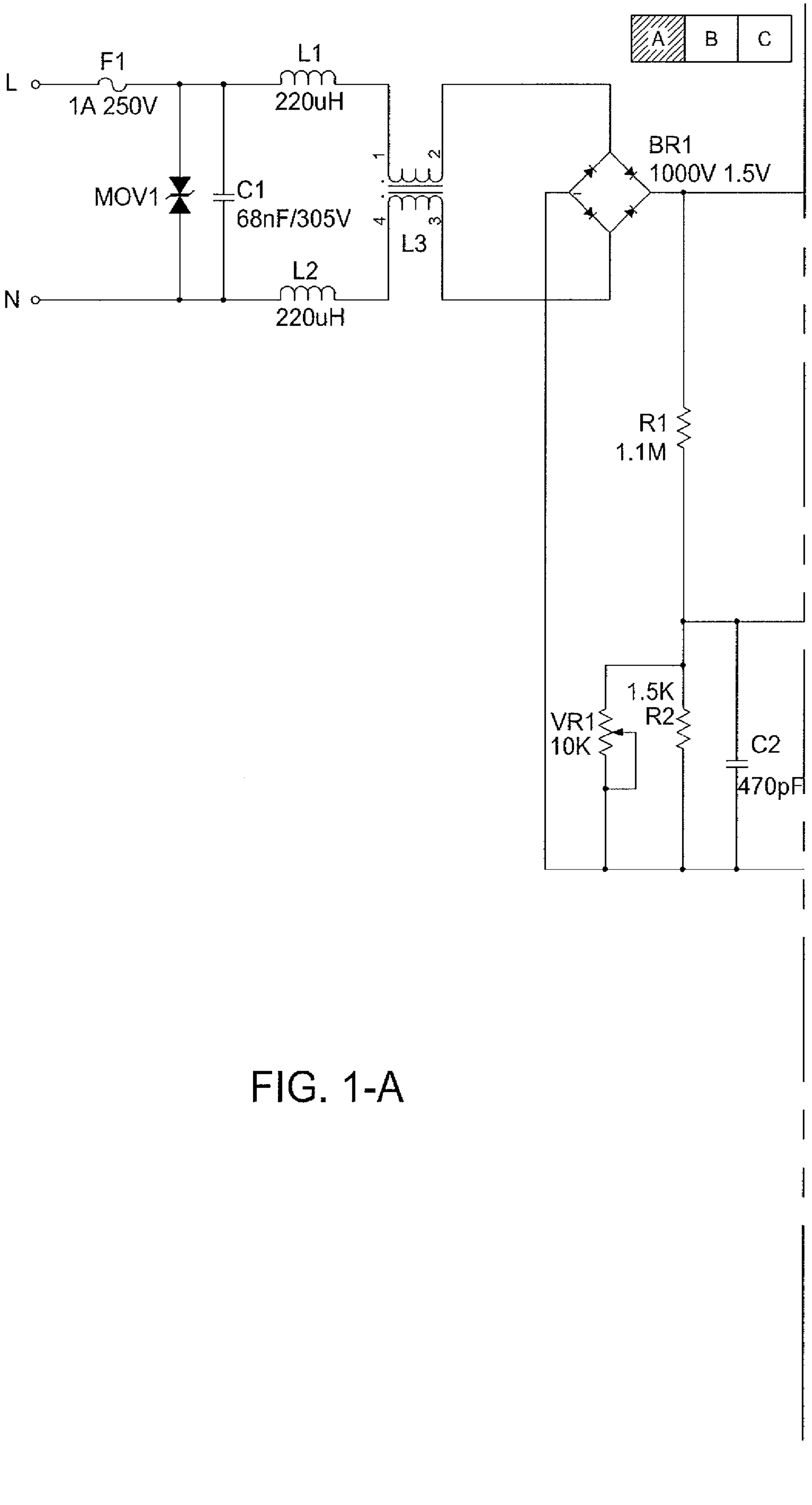
FIG. 1-A

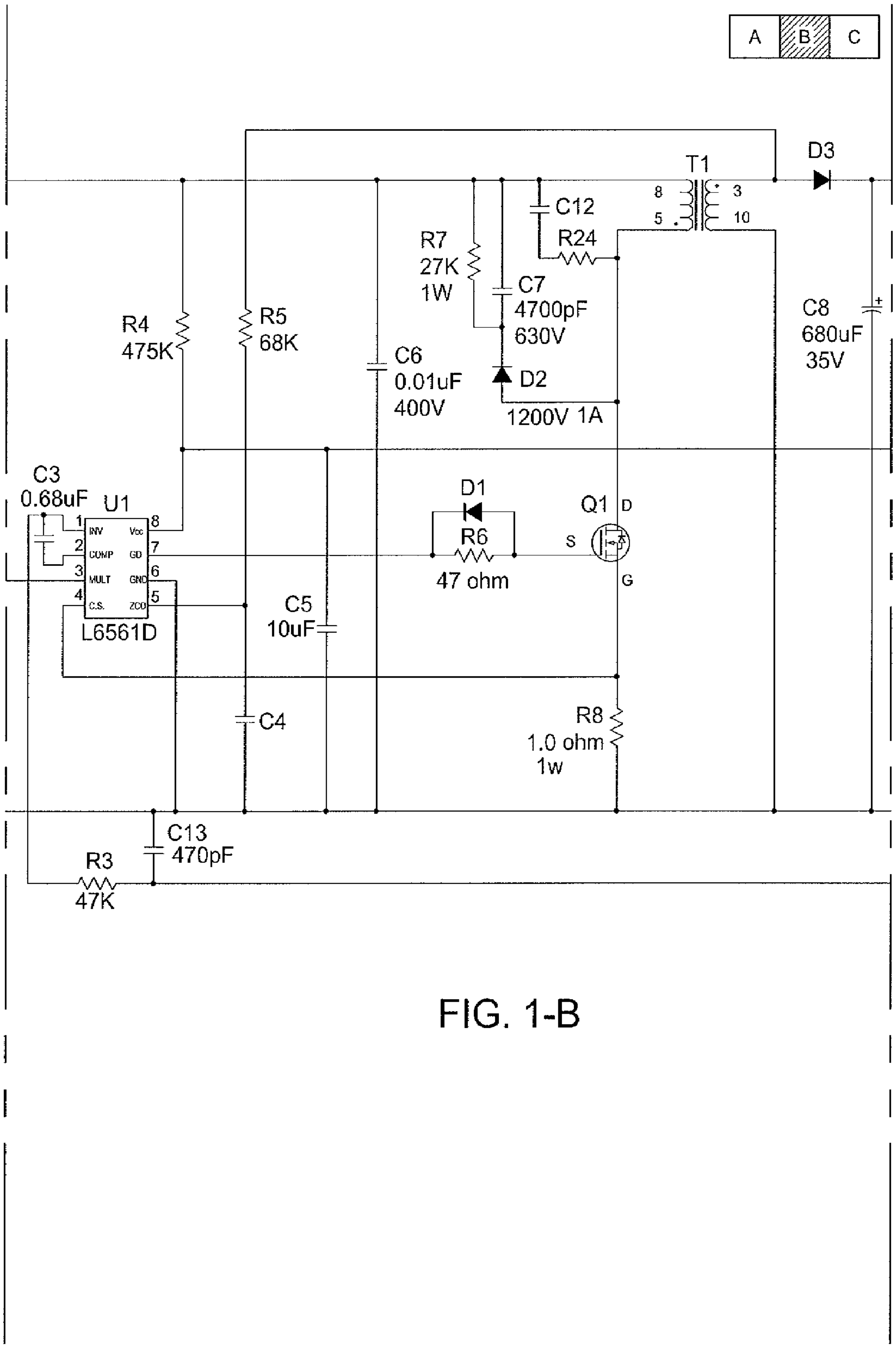
FIG. 1-B

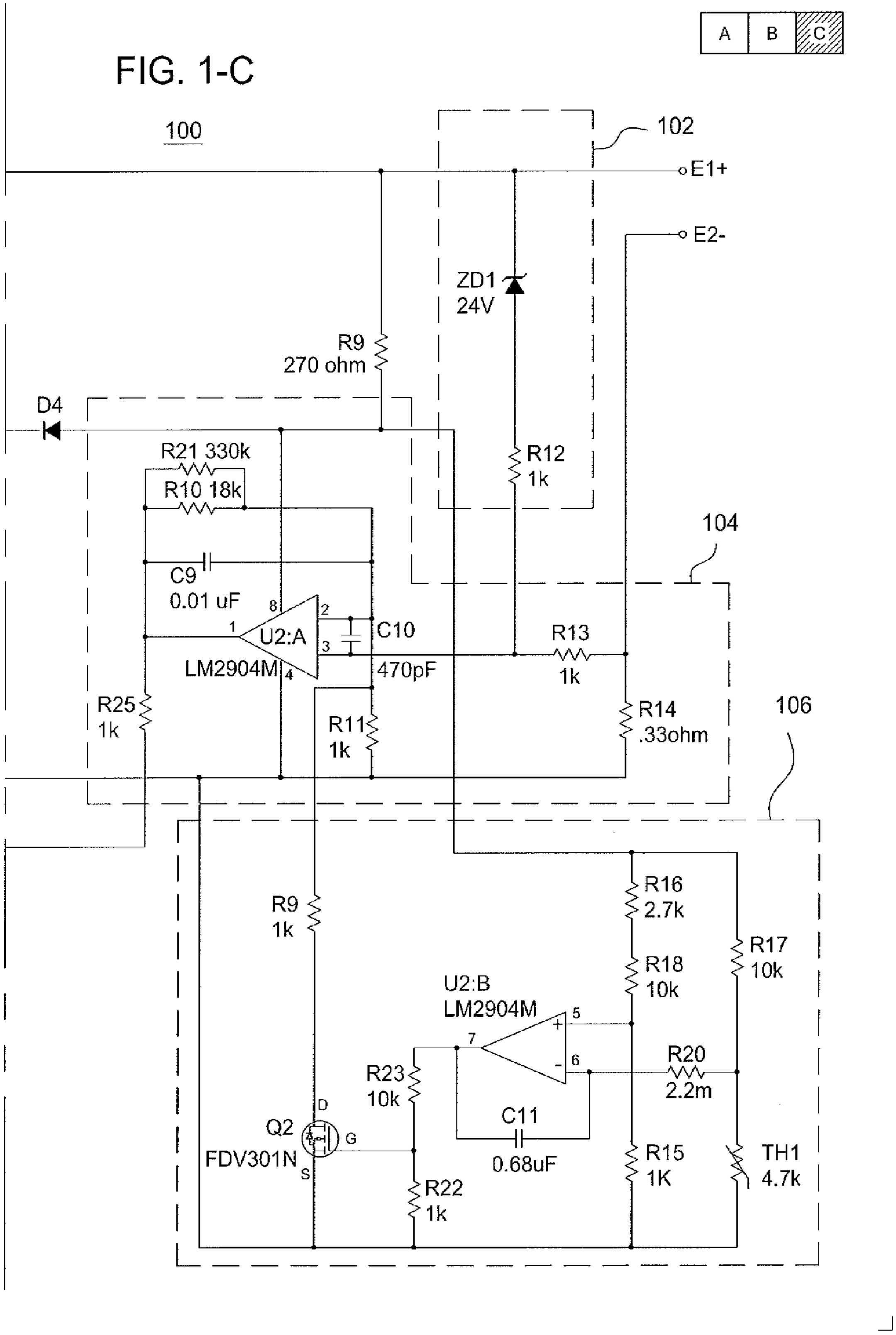
A
B
C
FIG. 1-C
100
102
E1+
E2-
ZD1
24V
R9
270 ohm
D4
R21 330k
R10 18k
R12
1k
104
C9
0.01 uF
8
2
1
U2:A
C10
3
R13
LM2904M
4
470pF
1k
R25
1k
R11
1k
R14
.33ohm
106
R16
2.7k
R9
1k
R17
10k
R18
10k
U2:B
LM2904M
5
7
6
R20
R23
10k
2.2m
D
C11
Q2
G
FDV301N
S
0.68uF
R15
1K
TH1
4.7k
R22
1k FIG. 2-A
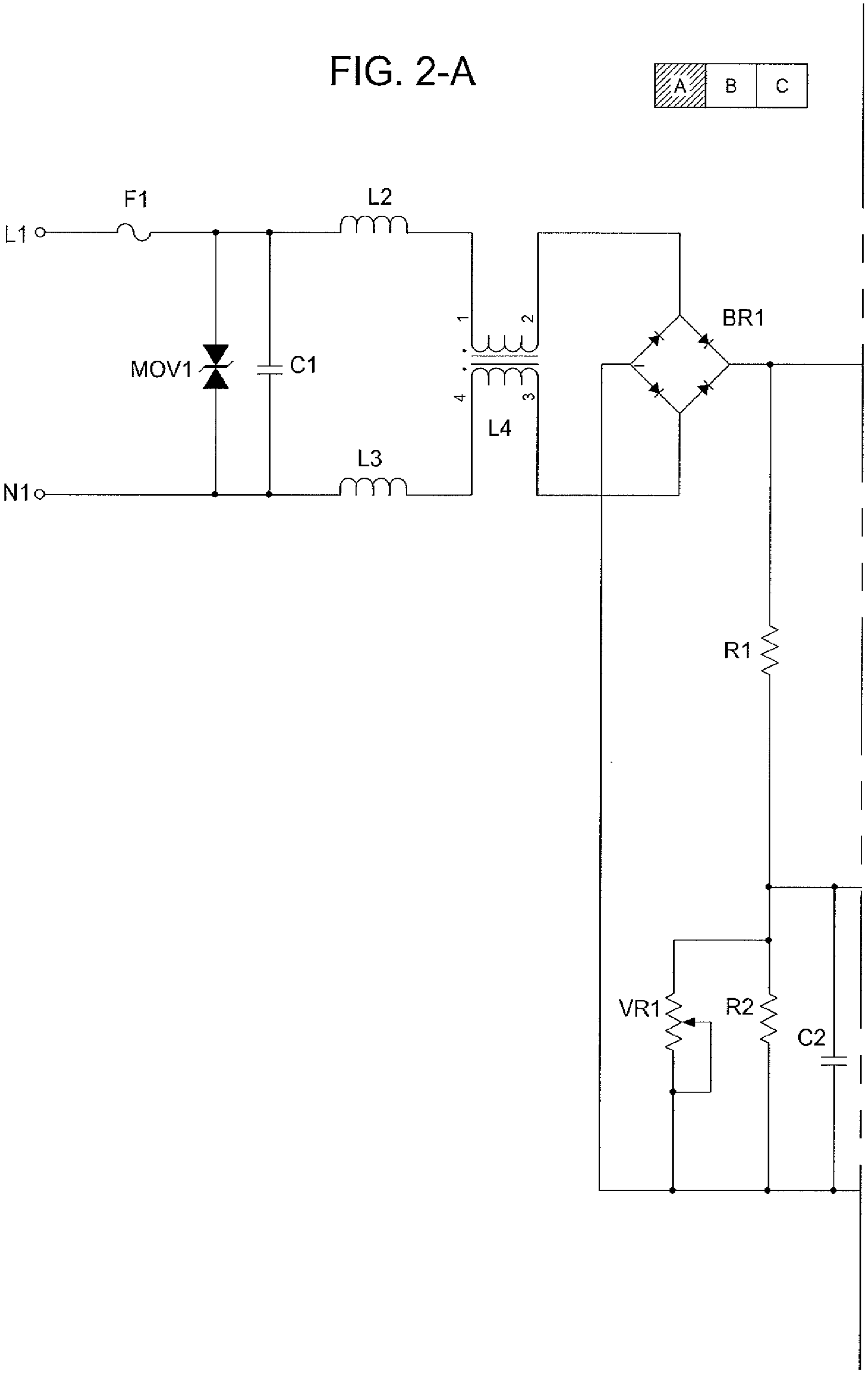

FIG. 2-B
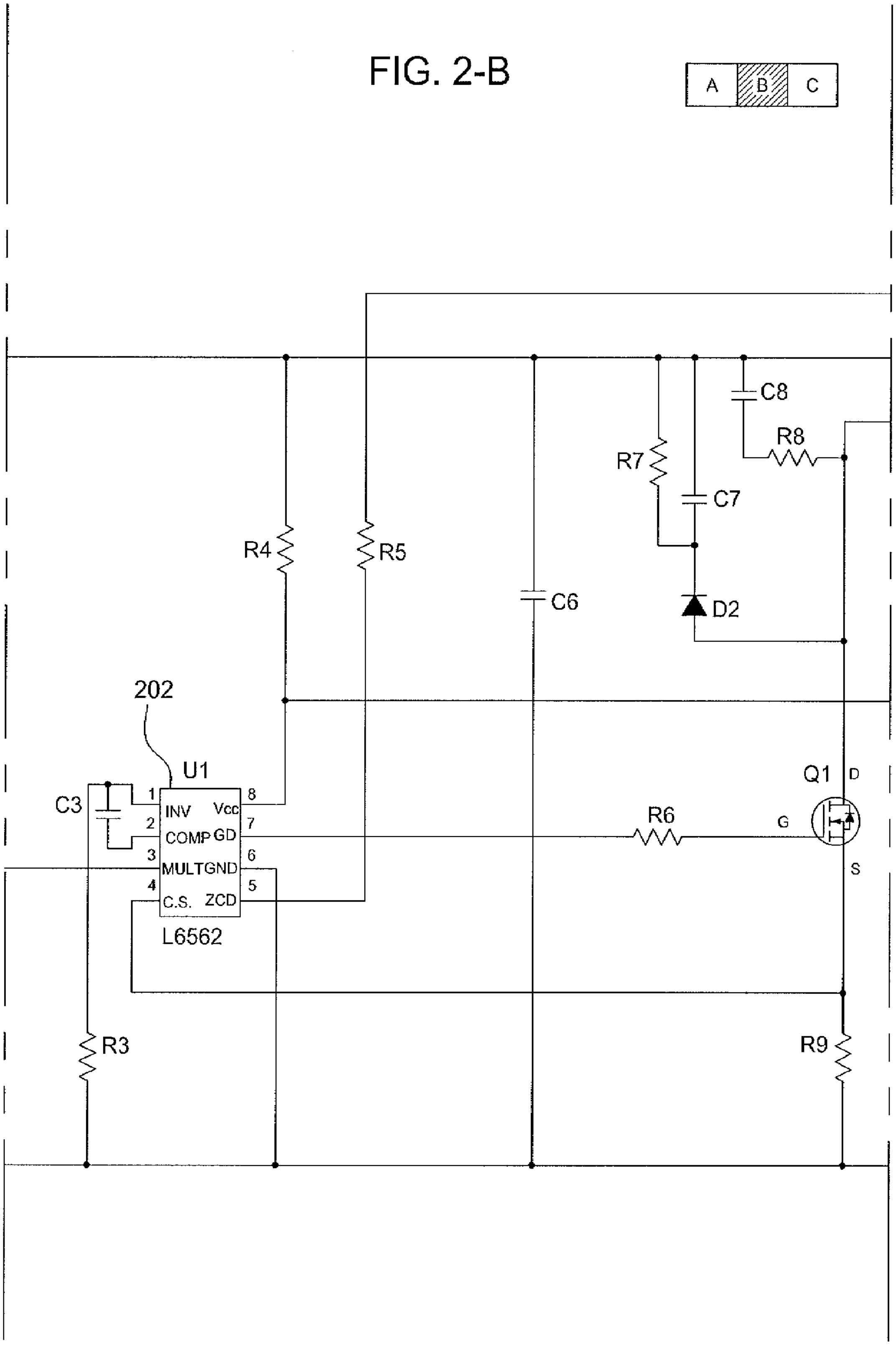

200
FIG. 2-C
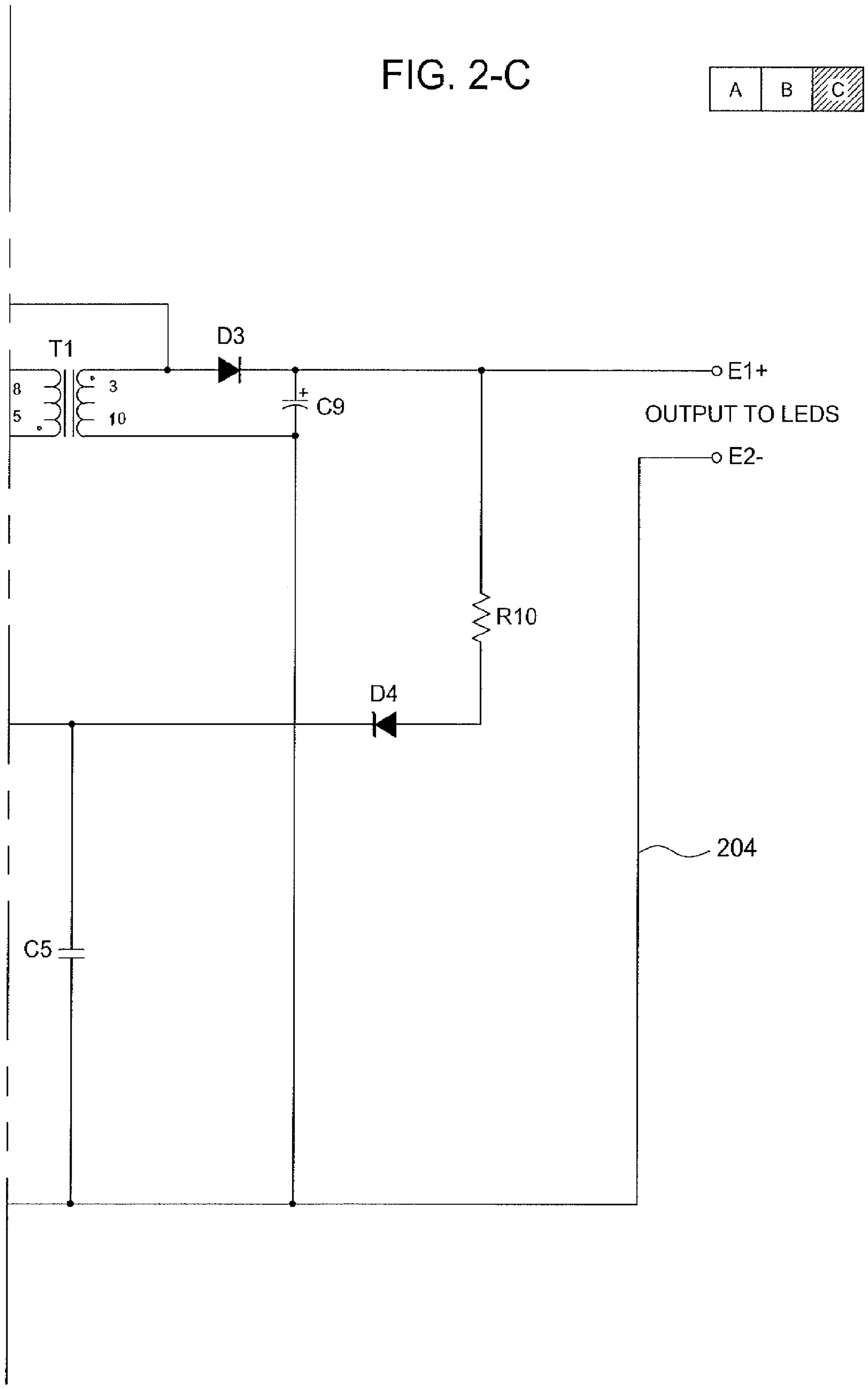

LIGHT EMITTING DIODE LUMINAIRE FOR CONNECTION IN SERIES

BACKGROUND

Presently, much lighting used for applications such as rail lighting, for example, still uses incandescent light bulbs. However, incandescent light bulbs are inefficient and need to be replaced regularly. Some applications may use a very large number of incandescent light bulbs. As a result, if the light bulbs regularly fail, having a large number of incandescent light bulbs creates a high cost due to both the cost of the new bulb and labor associated with its replacement.

In addition, some lighting systems require the incandescent light bulbs to be electrically connected in series. Traditional incandescent light bulbs can be connected in series across an AC or DC power supply. This allows lights to be used where the only supply available may be much higher than the voltage rating of the lights. Since the impedance of the incandescent light bulbs is constant, each receives an equal share of the total voltage and so operate predictably. Furthermore, since a filament bulb is a resistive load when connected in a serial string across an AC supply, power factor is unity.

However, other types of light sources may not behave as a traditional incandescent light bulb behaves when connected in series. As a result, simply replacing an incandescent light bulb with another type of light source is not trivial. For example, other types of light sources may have features of their behavior that prevent proper operation if electrically connected in series.

SUMMARY

The present disclosure relates generally to a light emitting diode (LED) luminaire. In one embodiment, the LED luminaire comprises a base, a heat sink coupled to the base, a power supply coupled to an interior volume of the heat sink, one or more LEDs coupled to the power supply, wherein the one or more LEDs are coupled to a circuit configured to provide a constant input impedance and a lens coupled to the heat sink and enclosing the one or more LEDs.

The present disclosure also provides a lighting system. In one embodiment, lighting system comprises a plurality of light emitting diode (LED) luminaires, wherein the plurality of light emitting diode luminaires is electrically connected in series, wherein each one of the plurality of LED luminaires comprise a circuit configured to provide a constant input impedance.

The present disclosure also provides a circuit for an light emitting diode (LED) luminaire. In one embodiment, the circuit for the LED luminaire comprises a power factor correction control integrated circuit (IC), wherein the power factor correction control IC has a plurality of pins and wherein a first one of the plurality of pins is connected to one or more resistors that set a current based upon a varying supply voltage.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1C depict a circuit diagram of a traditional light emitting diode (LED) circuit;

FIGS. 2A-2C depict a circuit diagram of an LED circuit without a current control loop;

To facilitate understanding, identical reference numerals have been used, where possible, to designate identical elements that are common to the figures.

DETAILED DESCRIPTION

Figure 3:
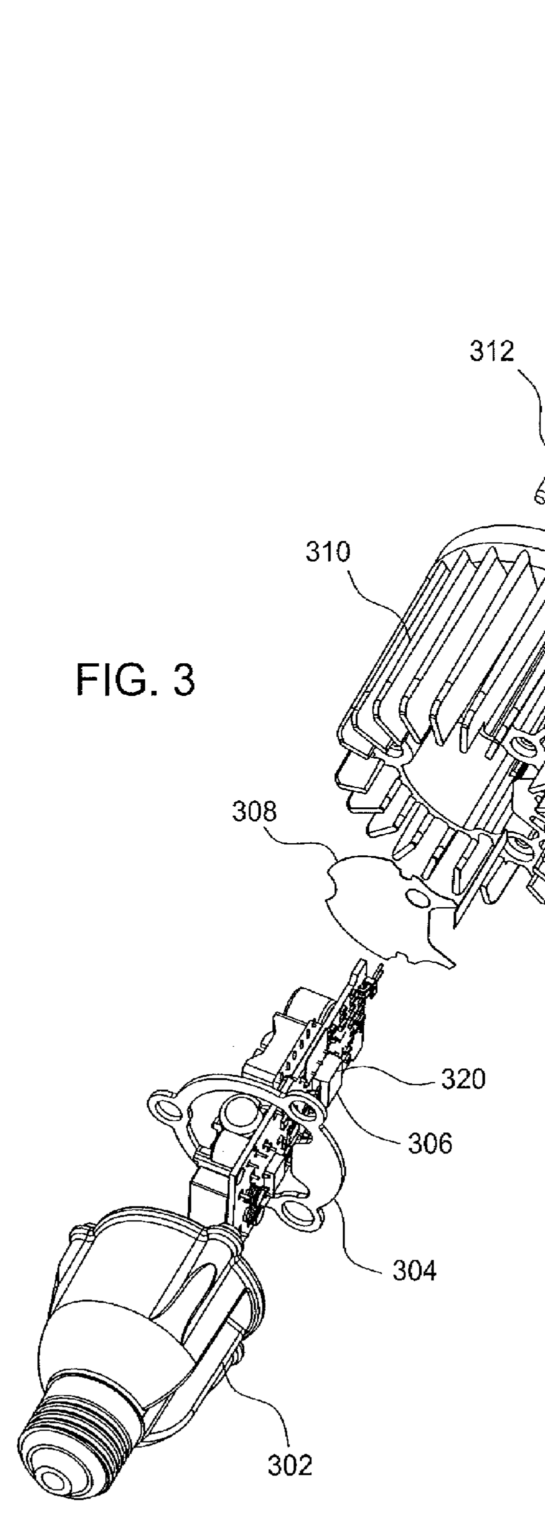
FIG. 3 depicts an exploded isometric view of the LED luminaire having an LED circuit without the current control loop.

Embodiments of the present disclosure are directed towards a light emitting diode (LED) luminaire for connection in series. As noted above, some light sources have behavior that prevents proper operation if electrically connected in series. LED luminaires with power factor corrected drivers are one example of such a light source.

Traditional LED circuits include a current control loop, also referred to as a current regulator. The current control loop adjusts the current delivered to the LED as it detects changes in voltages within the circuit. When the luminaires having LEDs are simply connected in series, across an alternating current (AC) supply, the load will have poor power factor due to the non-linear nature of the LEDs. Furthermore, simple resistance current limiting for LEDs is very inefficient.

More sophisticated LED luminaires generally utilize switch mode topologies for maximum efficiency along with power factor correction circuits and circuitry to control the LED current. But such circuitry has the effect of changing the input impedance to the LED luminaire as the supply voltage changes. As the supply voltage reduces, the LED luminaire draws more current to maintain a constant output power, so reducing the input impedance. If the supply voltage increases the input current is reduced, so raising the input impedance.

As a result, if two or more such LED luminaires were to be connected in series across either an AC or DC supply, a situation will arise whereby one or more luminaires reduce their input impedance to a minimum to try and maintain output power, while another luminaire goes to its maximum. This results in a severe voltage imbalance. This imbalance will not only result in improper operation, but likely in failure of one or more of the luminaires if connected across a supply greater than the rating of an individual luminaire.

FIG. 1 illustrates a diagram of a circuit 100 of a typical LED light source. The circuit diagram 100 includes various portions or modules that comprise the current control loops, e.g., an LED-current control loop. For example, a portion 102 provides over voltage protection that includes a zener diode ZD1. A portion 104 provides a current feedback that includes a resistor R13 and an amplifier U2:A. A portion 106 provides an over temperature control that includes an amplifier U2:B, capacitor C11 and a transistor Q2. These various portions or modules help to control the current in the LED.

FIG. 2 illustrates a diagram of a circuit 200 of an LED circuit without a current control loop, e.g., an LED-current control loop. It should be noted that the circuit 200 is only one way to achieve constant input impedance to allow LED luminaires to be connected in series. It should be noted that other designs may be used to achieve a constant input impedance and are within the scope of the present disclosure.

In one embodiment, the circuit 200 is without the current control loop illustrated in the circuit 100. In other words, the current control loop is absent from the circuit 200. Said another way, the circuit 200 does not have a current control loop or any type of current regulator monitoring the LED circuit current.

The circuit 200 comprises a power factor correction control integrated circuit (IC) 202 having a plurality of pins labeled 1-8. Notably, the circuit 200 directly connects a feedback pin (pin 1) to the return through a resistor R3, thus, disabling the current control loop. Unlike the circuit 100, the circuit 200 does not include the over voltage protection, LED current feedback or the over temperature control.

In one embodiment, the LED current (at a given supply voltage) is set by resistors R1, R2 and VR1, which drive the input-current wave-shape programming pin, pin 3. Rather than a fixed reference supply voltage, as is usual when constant LED current is desired, the supply voltage (which can vary) is the reference determining the LED current in the present circuit 200. The LED current may now be set by the input voltage, thus, achieving the desired constant input impedance.

The peak current in the switching FET Q1 is limited by means of current sense resistor R9 and the peak current sense pin, pin 4. This determines how much power is transferred through the transformer to the LEDs, so limiting their current.

In the embodiment illustrated in FIG. 2, the pin 1 does not connect directly to any LEDs. Normally, the pin 1 would be used to sense a voltage across a current sense resistor, either directly or indirectly, from a current sense amplifier connected to the LEDs. However, in the present embodiment, pin 1 is connected to the return so as to disable the constant-LED-current feedback loop, as well as any over voltage or temperature feedback as noted above.

As a result, when LED luminaires having the circuit 200 are electrically connected in series, the LEDs will operate properly due to the design of the circuit 200 in achieving constant input impedance. In other words, the LEDs will no longer malfunction due to one of the luminaires attempting to compensate for changes in voltage, thereby, removing voltage from one luminaire and putting a large voltage across another.

Figure 9:
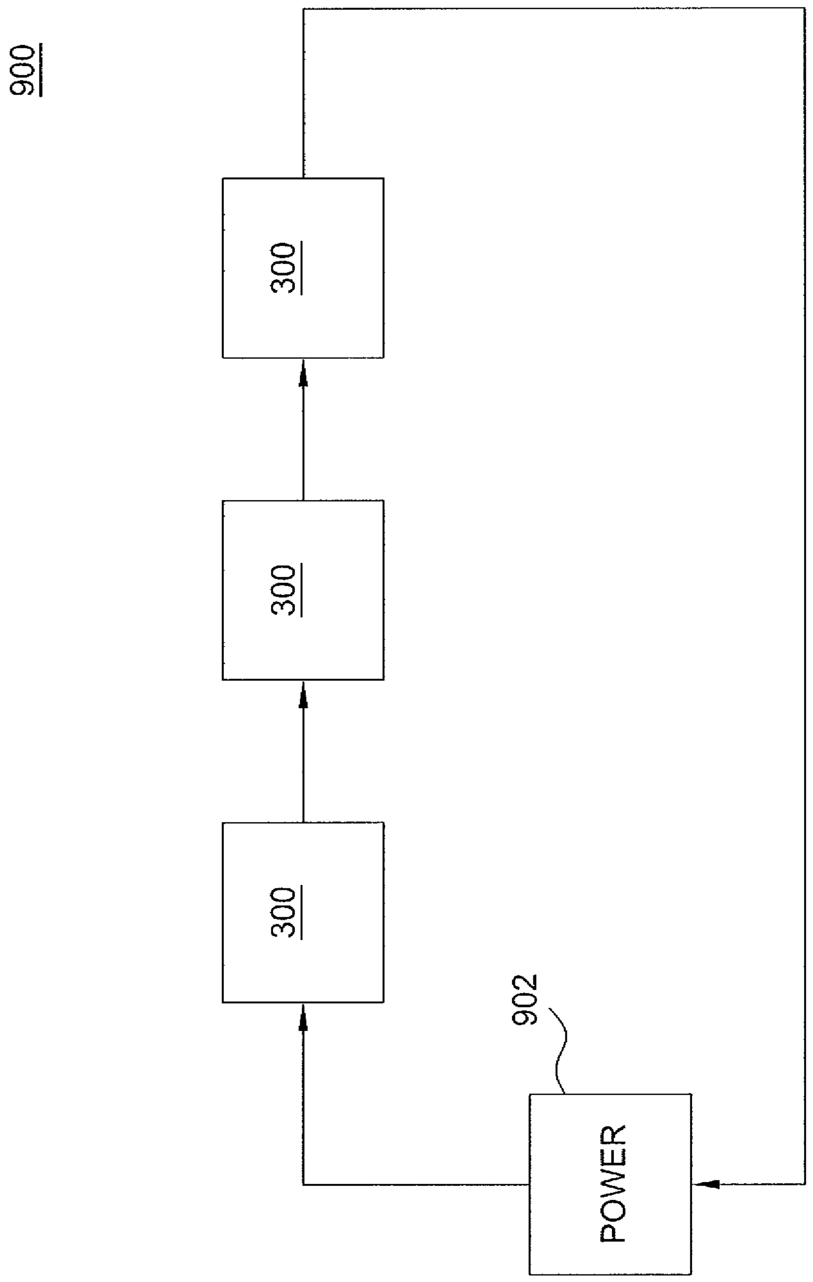
FIG. 9 depicts a block diagram of a plurality of LED luminaires connected in series.

FIG. 9 illustrates one embodiment of light system 900 comprising the LED luminaires 300 connected in series. For example, a plurality of LED luminaires 300 may be connected in series to a power supply 902.

Referring back to FIG. 2, to compensate for the removal of the current control loop, the circuit 200 is under driven with current. In other words, since there is no longer a current regulation mechanism on the circuit 200, a slightly lower amount of current is driven through the circuit 200 than what the circuit 100 would typically receive or the LED is rated for.

The circuit 200 maintains power factor correction. Power factor correction may be defined as forcing the input current to follow the same shape as the input voltage. In other words, the input current is corrected to form a sine wave when driven from an AC supply. Power factor correction is important for some applications where a company can be penalized by the power generating companies for bad power factor that can generate harmonics that can cause problems for the power generation system.

The circuit 200 illustrated in FIG. 2 allows the LED luminaires to be connected in series is that the circuit 200 provides a constant input impedance necessary for series connection. In other words, the LED current is proportional to the input voltage. Said another way, the LED current (and hence the input current) is allowed to vary in proportion to the supply voltage. It should be noted that although one way to achieve this goal is by removing the current control loop as illustrated in FIG. 2, other methods may be employed to achieve this goal to allow LED luminaires to be connected in series and are within the scope of the present disclosure.

FIG. 3 illustrates an exploded isometric view of an LED luminaire 300 having an LED circuit without the current control loop. In one embodiment, the LED luminaire 300 may have a circuit 200 similar to the one illustrated in FIG. 2.

In one embodiment, the LED luminaire 300 comprises a housing 302, a power supply 306, a heat sink 310 and an outer lens 318. In one embodiment, the power supply 306 may be designed with the circuit 200 illustrated in FIG. 2. In other words, the power supply 306 does not have a current control loop and provides a constant input impedence.

In one embodiment, the housing 302 may be a Edison base. In one embodiment, the heat sink 310 may include one or more fins 324 to help dissipate heat away from the LED luminaire 300.

In one embodiment, the LED luminaire 300 may be assembled by inserting the power supply 306 into the housing 302. In one embodiment, the housing 302 may include potting. A gasket 304 may be placed in between the housing 302 and the heat sink 310. An insulator 308 may be placed on top of the power supply 306. The insulator 308 may be fabricated from a material such as Mylar®, for example.

Figure 4:
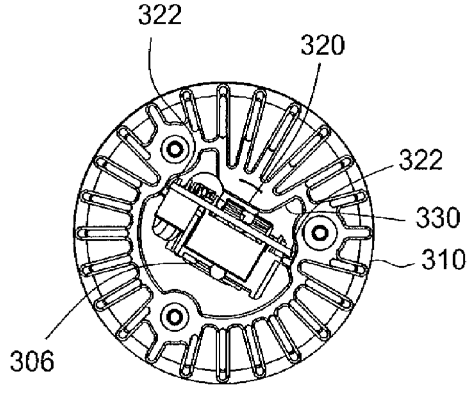
FIG. 4 depicts a top view of the power supply coupled to a heat sink of the LED luminaire.

In one embodiment, the power supply 306 may be aligned and inserted into the heat sink via slots 322 illustrated in FIG. 4. For example, FIG. 4 illustrates a top view of the power supply 306 inserted into the heat sink 310.

In one embodiment, a semiconductor package 320, e.g., a D2 PAK, of the power supply 306 is in contact with a protruding portion 330 of the heat sink 310. In one embodiment, the semiconductor package 320 may be bonded to the heat sink 310 via an adhesive or epoxy. Notably, the power supply 306 is in direct contact with multiple points of an interior volume of the heat sink 310. This helps to quickly dissipate heat out of the LED luminaire 300 and require less potting.

Referring back to FIG. 3, a thermal backing 314 may be placed on top of the heat sink 310 and under the light engine 316. The light engine 316, the thermal backing 314, the heat sink 310, the gasket 304 and the housing 302 may be coupled together via one or more screws 312. The outer lens 318 may be coupled to the heat sink 310.

Figure 5:
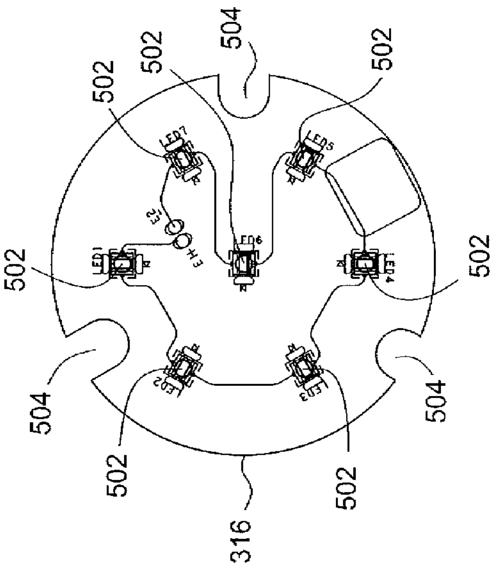
FIG. 5 depicts a top view of a light engine of the LED luminaire.

FIG. 5 illustrates a top view of the light engine 316. For example, the light engine 316 may include one or more LEDs 502. The one or more LEDs 502 in the light engine 316 may be connected in series or in parallel. The light engine 316 may also include one or more alignment slots 504 to properly align the light engine 316 to the heat sink 310.

Figure 8:
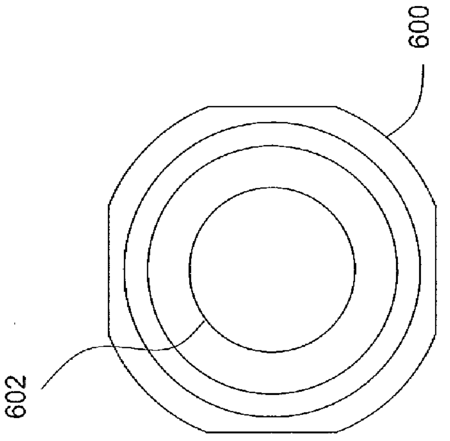
FIG. 8 depicts a bottom view of the vibration damper.
Figure 7:
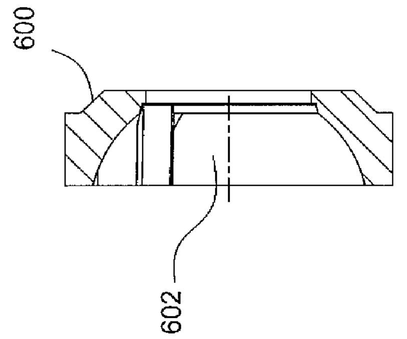
FIG. 7 depicts a cross-sectional side view of the vibration damper.
Figure 6:
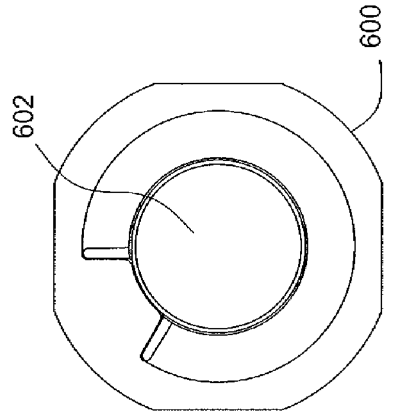
FIG. 6 depicts a top view of a vibration damper.

FIGS. 6-8 illustrate various views of a vibration damper 600. The vibration damper 600 may be optional. FIG. 6 illustrates a top view of the vibration damper 600. The vibration damper 600 may be fabricated from any type of polymer, e.g., polycarbonate. In one embodiment, the vibration damper 600 may be coupled to the bottom of the housing 302. The threaded end of the housing 302 may be fed through the opening 602 of the vibration damper 600.

FIG. 7 illustrates a cross-sectional side view of the vibration damper 600. FIG. 8 illustrates a bottom view of the vibration damper 600. The vibration damper 600 provides vibration dampening to the LED luminaire 300. In addition, the vibration damper 600 provides a more sturdy base to support the weight of the LED luminaire 300 when they are installed in series, e.g., as part of railway lighting system where high vibration levels may occur.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A light emitting diode (LED) luminaire, comprising:

a base;

a heat sink coupled to the base;

an alternating current (AC) power supply coupled to an interior volume of the heat sink;

one or more LEDs coupled to the AC power supply, wherein the one or more LEDs are coupled to a circuit configured to provide a constant input impedance by allowing an LED current to vary in proportion to a supply voltage that varies and the circuit comprises a power factor correction integrated circuit, wherein the one or more LEDs are not coupled to a current regulator; and a lens coupled to the heat sink and enclosing the one or more LEDs, wherein the constant input impedance is achieved by the circuit being without a current control loop.

2. The LED luminaire of claim 1, wherein the supply voltage varies.

3. The LED luminaire of claim 1, wherein the one or more LEDs are under driven.

4. The LED luminaire of claim 1, wherein the LED luminaire is connected in series with a plurality of other LED luminaires.

5. The LED luminaire of claim 1, wherein the power supply is in direct contact with the heat sink.

6. A lighting system, comprising:

a plurality of light emitting diode (LED) luminaires, wherein the plurality of LED luminaires is electrically connected in series and powered by an alternating current source wherein an LED current varies in proportion to a supply voltage that varies, wherein each one of the plurality of LED luminaires comprises a circuit configured to provide a constant input impedance and the circuit comprises a power factor correction integrated circuit, wherein the circuit does not include a current regulator, wherein the constant input impedance is achieved by the circuit being without a current control loop.

7. The lighting system of claim 6, wherein the supply voltage varies.

8. The lighting system of claim 6, wherein one or more LEDs of each one of the plurality of LED luminaires are under driven.

9. The lighting system of claim 6, wherein the power supply is in direct contact with a heat sink.

10. The lighting system of claim 6, wherein the lighting system comprises a railway lighting system.

11. A circuit for a light emitting diode (LED) luminaire that achieves a constant input impedance, comprising:

one or more resistors that set a current based upon a varying supply voltage to achieve the constant input impedance; and a power factor correction control integrated circuit (IC), wherein the power factor correction control IC has a plurality of pins, wherein a first one of the plurality of pins is connected to a return of a second one of the plurality of pins via a second resistor to disable a current control loop, wherein the constant input impedance is achieved by the circuit being without a current control loop.

12. The circuit of claim 11, a third one of the plurality of pins is coupled to a current sense resistor to limit a peak current in a switching field effect transistor.

* * * * *